350-286.   AU 257   EX
       XR   3,814,945

United States Patent [19]
Allnutt et al.

[11] 3,814,945
[45] June 4, 1974

[54] APPARATUS FOR AUTOMATIC INSPECTION OF MATERIALS

[75] Inventors: Anthony John Allnutt, Chiselhurst; Barry John Biddles; Richard Anthony Brook, both of Sidcup; Robert Ernest Vickers Semos, Paddock Wood; Robert Noel West, Orpington, all of England

[73] Assignee: Sira Institute, Kent, England

[22] Filed: Mar. 8, 1972

[21] Appl. No.: 232,894

[30] Foreign Application Priority Data
Mar. 9, 1971   Great Britain .................. 6347/71
Nov. 9, 1971   Great Britain .................. 51940/71

[52] U.S. Cl. .................. 250/571, 250/235, 250/572, 356/209
[51] Int. Cl. ............................................. G01n 21/30
[58] Field of Search ....... 250/219 DF, 219 DE, 234, 250/235, 236, 237; 350/106, 182; 331/94.5 A; 356/203, 209

[56] References Cited
UNITED STATES PATENTS

| | | | |
|---|---|---|---|
| 2,571,937 | 10/1951 | Peck | 356/106 R |
| 2,719,235 | 9/1955 | Emerson | 250/219 DF |
| 2,798,411 | 7/1957 | Coleman | 350/182 |
| 3,135,867 | 6/1964 | Daneff | 250/219 WE |
| 3,198,951 | 8/1965 | Lentze | 250/219 WE |
| 3,338,130 | 8/1967 | Gaffard | 250/219 DF |
| 3,345,835 | 10/1967 | Nickell | 250/219 DF |
| 861,056 | 4/1969 | Buckson | 250/219 DF |
| 3,574,469 | 4/1971 | Emerson | 250/219 DF |
| 3,582,666 | 6/1971 | Geiger | 250/226 |
| 3,675,016 | 7/1972 | Blaisdell | 250/219 WE |
| 3,676,008 | 7/1972 | West | 250/219 DF |

Primary Examiner—James W. Lawrence
Assistant Examiner—D. C. Nelms
Attorney, Agent, or Firm—Sughrue, ROthwell, Mion, Zinn & Macpeak

[57] ABSTRACT

Apparatus for automatically inspecting materials to locate defects or flaws by directing light onto or through the material and by providing an electrical signal from the light influenced by the material. A scanning means serves to scan the material. In one construction the scanning means is a rotatable body with light-reflective surfaces on its periphery the body being used to direct the light from a source onto the material as a line scan. In another construction the scanning means is a rotatable drum with lenses disposed around its periphery, the lenses serving to receive light influenced by the material. A static reflecting means which may comprise a cylindrical mirror or a special arrangement comprising a beam splitting device combined with one or more pieces of retroreflective tape is arranged to direct light to or from the material. The rotatable body and the detecting means producing the electrical signal are located at conjugate positions in relation to the optical system comprising the static reflecting means and the material. Two objects are at conjugate positions, that is in mutual conjugacy, when rays of light diverging from either object will be brought to focus at the other object. Alternatively the source and the rotatable drum are located at conjugate positions in relation to the said optical system.

28 Claims, 15 Drawing Figures

APPARATUS FOR AUTOMATIC INSPECTION OF MATERIALS

BACKGROUND TO THE INVENTION

The present invention relates to apparatus for use in the automatic inspection of materials to detect the presence of defects or flaws.

A general object of this invention is to provide an improved apparatus for inspecting materials with particular regard to increased speed and accuracy of operation.

SUMMARY OF THE INVENTION

According to the present invention there is provided apparatus for inspecting materials; said apparatus comprising source means for providing a beam of electromagnetic radiation, means for scanning the material under investigation, static radiation reflecting means and means for deriving an electrical signal from scanned radiation influenced by the presence of the material, which signal is indicative of defects in the material under investigation, the static reflecting means being arranged to re-direct radiation to or from the material with a combination of the source means, the scanning means and the deriving means being located at conjugate positions in relation to the static reflecting means and the material.

In one form the scanning means can be a rotatable body having a plurality of radiation-reflective surfaces onto which the beam provided by said source means is directed with the radiation reflected from said surface being in turn directed at the material and wherein the deriving means and the scanning means are conjugate in relation to the static reflecting means and the material.

In another form the scanning means can be a rotatable drum having a plurality of lenses arranged around its periphery, the lenses being adapted to collect radiation transmitted through or reflected by the material with the collected radiation being received by the deriving means and wherein the source means and the scanning means are conjugate in relation to the static reflecting means and the material.

The static reflecting means preferably includes a beam splitting device and one or more retro-reflective means although a cylindrical mirror can be used.

According to one embodiment of the invention there is provided an apparatus for use in the automatic inspection of materials, said apparatus comprising source means for providing a beam of radiation, a rotatable body having a plurality of plane radiation-reflective surfaces onto which said beam is directed, static reflecting means for directing radiation reflected from the surfaces of said device in sequence onto the material to be inspected and means for converting radiation reflected transmitted or otherwise emanating from said material into an electrical signal indicative of the characteristics of said material.

The source means for providing the beam of radiation is preferably a laser supplemented by a beam shaping arrangement which may produce a beam of rectangular cross-section. The beam shaping arrangement may comprise an optical system for expanding the cross-section of the laser beam and the expanded beam may be further shaped by using one or more apertured plates and a prism assembly serving to reduce one dimension of the beam passed through the aperture.

The rotatable body can be rotated by a synchronous electric motor and gearing at speeds of about 20,000 r.p.m., thus enabling a high speed of operation to be achieved. The reflective surfaces of the body can be mirror-like facets formed on the periphery of the body which may be polygonally shaped. As the body rotates each surface causes a spot of light to be moved across the material to be inspected. Movement of the latter generally perpendicular to the scanning direction can thus enable an area thereof to be inspected. In an analogous manner a rotatable drum having lenses around its periphery would scan the material so that each lens forms an image of a part of the material.

The electrical signal deriving means may be a transducer assembly with an entry aperture receiving incoming radiation from the material. This incoming radiation can be passed through a filter transmissive to the wavelength of the laser beam and a diffuser receiving light transmitted by the filter can be used to spread the light onto the photocathode of a photomultiplier device. The filter, diffuser and photomultiplier device are preferably contained in a common housing. A lens can be provided at the ingress to the housing.

The anode from the photomultiplier device produces the aforesaid electrical signal which is in the form of a waveform composed of a series of voltage pedestals each indicative of one scan across the material by the scanning means. Appropriate circuitry, such as is disclosed in our U.S. Patent application Ser. No. 20661 herein incorporated by reference can detect the presence of flaw indicative information in the waveform.

The invention also provides an arrangement for use in re-directing a beam of electromagnetic radiation in material inspection apparatus, said arrangement comprising retro-reflective means and a beam splitting device for passing a component of an incident beam of radiation to the retro-reflective means and for providing an emergent re-directed beam of radiation from the radiation generally reflected by the retro-reflective means.

The retro-reflective means can be at least one body adapted to reflect radiation back along a path by which it is incident on the body with or without a certain degree of scatter or diffusion.

In its most convenient form the retro-reflective means can be a tape containing numerous small reflective particles. In another form the retro-reflective means can be composed of a plurality of reflective elements each shaped to correspond to a corner of a cube and affixed in position.

Where the radiation is light the beam splitting device can be any one of a variety of different known types of device such as semi-reflective mirrors. Where the radiation is of other wavelengths the exact nature of the beam splitting device and the retro-reflective means would be modified accordingly. For instance, at microwave wavelengths the beam splitting device may be a dielectric sheet or a pierced conductive mask. Where some loss of radiation can be tolerated the retro-reflective means can be a single piece of retro-reflective tape arranged to intercept radiation transmitted by or reflected by the beam splitting device. Otherwise maximum efficiency can be achieved by disposing one or more pieces of tape so as to intercept the radiation transmitted and reflected by the beam splitting device.

The invention may be understood more readily and various other features of the invention may become more apparent from consideration of the following description.

BRIEF DESCRIPTION OF DRAWINGS

Embodiments of the invention will now be described, by way of examples only, with reference to the accompanying drawings, wherein.

DESCRIPTION OF PREFERRED EMBODIMENTS

Figure 1:
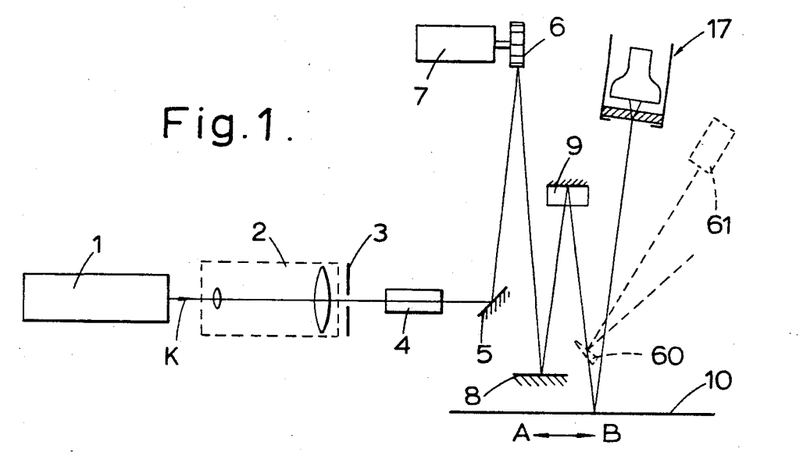
FIG. 1 is a schematic side view of a material inspecting apparatus made in accordance with the invention.

Referring initially to FIG. 1, a first embodiment of a material-inspection apparatus is depicted as inspecting sheet material designated 10 to detect the presence of defects. The material 10 has an upper specularly-reflective surface which is investigated but it should be understood that with appropriate modification the apparatus can be used inter alia with radiation transmissive materials or with materials having diffusely reflective surfaces. The apparatus is composed of a laser 1 which emits a beam of light denoted K. The term "light beam" used in this specification is intended to include at least the infra-red and ultra-violet wavelength ranges as well as the visible range. The light beam from the laser 1 is generally shaped by an arrangement 2, 3, 4 which will be described in more detail hereinafter. The shaped radiation beam is directed by means of a plane mirror 5 onto reflective surfaces of scanning means in the form of a rotatable scanning device 6 which again is described in more detail hereinafter. The device 6 is rotated by drive means 7.

The beam reflected from the device 6 as a line scan perpendicular to the general plane of FIG. 1, is directed via a further plane mirror 8 onto static reflecting means in the form of a cylindrical mirror 9 and thence onto the sheet 10. Finally the beam reflected from the upper surface of the sheet 10 passes into a transducer assembly denoted 17 constituting a means for producing an electrical signal. The path of the light beam can best be appreciated from consideration of FIG. 1 in conjunction with FIG. 2. The device 6 and the assembly 17 are optically conjugate relative to the mirror 9 and the material 10.

In general, the rotation of the device 6 causes a spot of light to be scanned across the sheet 10 in a direction perpendicular to the general plane of FIG. 1. By moving the sheet 10 in the direction of arrow A or B (FIG. 1), an area of the upper surface of the sheet 10 can be scanned to detect the presence of defects. The apparatus as a whole operates so that the assembly 17 produces a signal which has a waveform shown in FIG. 10. This waveform is composed of a series of voltage pedestals each representing one scan across the sheet 10. The presence of defects on the upper surface of the sheet 10, or within the material itself in the transmission mode of operation, causes transitions in the upper level of the pedestals, as denoted M in FIG. 10. This defect indicative information can be detected by electronic means such as is disclosed in our U.S. Patent application Ser. No. 20661 herein incorporated by reference.

The inspecting apparatus is particularly adapted to operate at high speeds. The operational signal to noise ratio can be maintained at relatively high values due to the high intensity of light provided by the laser 1 and this in turn provides improved sensitivity. To increase the signal to noise ratio to higher values, by compensating for noise within the laser beam itself, a reference signal can be obtained which is fed to a differential amplifier also receiving the signal produced from the transducer assembly 17. As shown in dotted lines in FIG. 1, the reference signal can be obtained by interposing a prism 60 between the mirror 9 and the sheet 10 and by receiving a component of the beam reflected from the prism 60 in a further transducer assembly 61.

Figure 2:
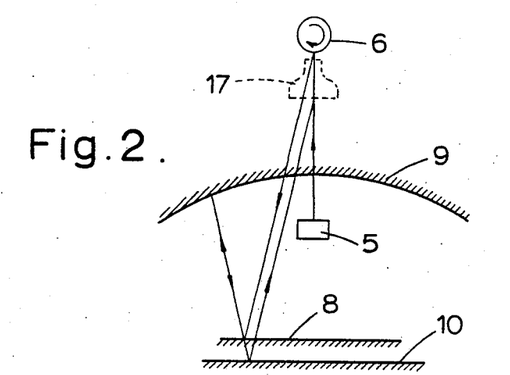
FIG. 2 is a schematic end view of the apparatus shown in FIG. 1.

The component parts of the apparatus depicted in FIGS. 1 and 2 and described briefly above will now be described in more detail.

Figure 3:
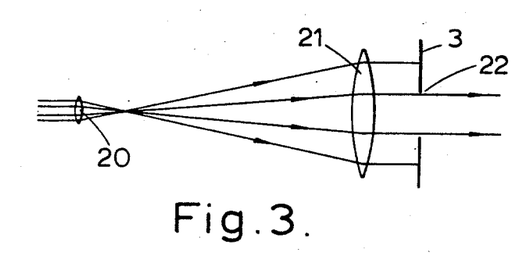
FIG. 3 is a more detailed side view of part of the beam shaping arrangement of the apparatus shown in FIG. 1.

The beam shaping arrangement is composed of a beam expanding device 2, an apertured plate 3 and a prism assembly 4. The components 2 and 3 are shown in more detail in FIGS. 3 and 4. The device 2 is in the form of two spaced-apart lenses 20, 21 which serve to expand the beam emitted by the laser 1 from a cross-sectional diameter of 2 mm to about 30 mm. The expanded beam can be passed through a square aperture 22 in the plate 3. The beam emanating from the lenses 20, 21 is centred on the aperture 22 so that the latter passes an acceptable uniformity of luminous flux. Since the subsequent prism assembly 4 introduces astigmatism one dimension of the aperture 22 will always be out of focus with the surface being inspected. To overcome this problem it may be desirable to replace the plate 3 with two plates each having an elongate slit therein. These slits are orthogonally disposed relative to one another and separated along the optical axis of the arrangement. The slits are aligned with the prism assembly 4 on the optical axis and the image of the slits would be focussed onto the surface under inspection.

Figure 4:
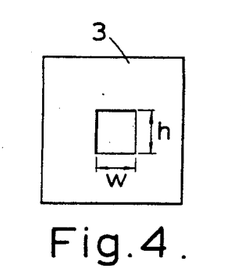
FIG. 4 is an end view of the components shown in FIG. 3 and more particularly depicting the dimensions of the light beam.
Figure 5:
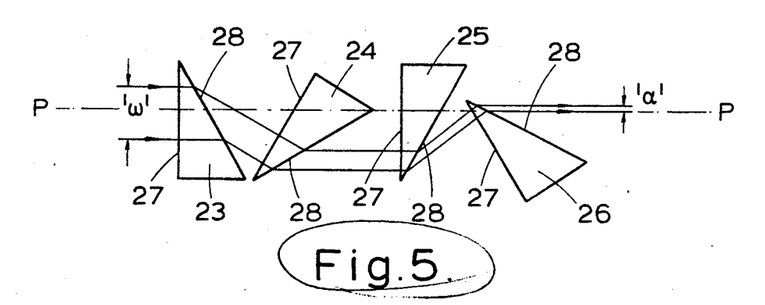
FIG. 5 is a more detailed plan view of the prism assembly used in the beam shaping arrangement of the apparatus shown in FIG. 1.

The beam passed through the aperture 22 or the equivalent orthogonal slits has a width dimension $w$ and a height dimension $h$ as shown in FIG. 4. This beam is converted by the prism assembly 4 into a beam of height $h$ and width $a$ where $a$ is less than $w$. The prism assembly is depicted in FIG. 5. As shown in FIG. 5, the assembly consists of four prisms 23, 24, 25 and 26. The path of the beam through the assembly is shown where the width of the incoming beam is $w$ and the width of the outgoing beam is $a$; the incoming and outgoing beams having the same optical axis P—P. Each prism 23–26, has a first surface 27 which is arranged normal to the beam entering the prism. The surface 27 of each prism 23–26 is preferably coated with an anti-reflection material. Each prism 23–26 has a second surface 28 which is angularly arranged so that the "Brewster" angle is formed between the beam leaving the prism and the surface 28. The reduction in the width of the beam entering and leaving each prism 23–26 is numerically equal to the refractive index of the material of the prism, so in this case assuming the prism 23–26 are made of the same material the beam width reduction is $\mu^4$, where $\mu$ is the refractive index of the prism material. Various numbers of prisms can be employed to achieve the desired reduction in the beam width.

Figure 6:
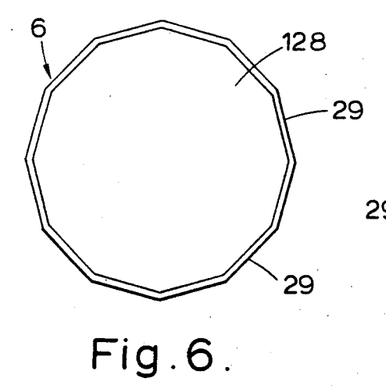
FIG. 6 is a more detailed end view of the scanner device used in the apparatus shown in FIG. 1.
Figure 7:
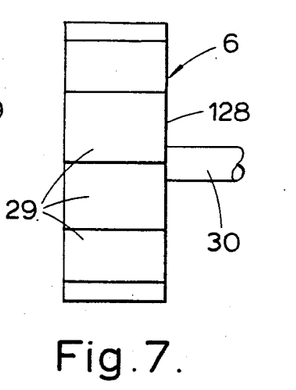
FIG. 7 is a side view of the scanner device shown in FIG. 6.

The scanner device 6 is shown in more detail in FIGS. 6 and 7, and as shown the device 6 is in the form of a polygonal body 128 with a number, in this case twelve, of plane reflective surfaces or facets 29. The body 128 is carried by a shaft 30. The body 128 can be made from solid glass with aluminium coatings forming the facets 29. Alternatively, the body 128 can be made from a solid metallic material of low weight such as duralumin. The facets 29 can in this case be formed from rectangular glass blocks attached to the body and having reflective outer coatings such as aluminium. In another construction the body 128 is made of a solid metallic material of low weight and the facets 29 are formed by polishing the outer peripheral faces of the body. The device 6 is rotated at constant speed, typically about 20,000 r.p.m. The drive means 7 (FIG. 1) for the device 6 can be a synchronous electric motor coupled to the shaft 30, the motor being supplied with an alternating electrical supply, for example at 400 Hz. Alternatively an air turbine can be coupled to the shaft 30.

Figure 8:
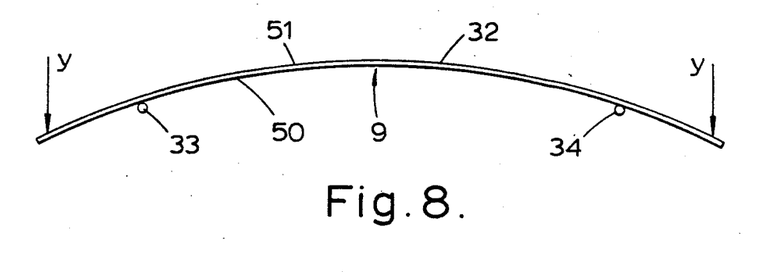
FIG. 8 is a schematic illustration depicting the preferred method of making the cylindrical mirror used in the apparatus shown in FIG. 1.

As illustrated in FIG. 8 the cylindrical mirror 9 is preferably made by uniformly deforming a laminar body 32 into an arc of a circle. In manufacture, the body 32 can be abutted against two supports 33, 34 and subjected to stressing forces denoted Y. The body 32 is preferably formed from a laminated synthetic plastics substrate 51 to which is attached a thin layer 50 of aluminised perspex forming the mirror surface. The substrate and perspex can be attached to one another by means of a resilient adhesive which will relieve the stresses when the body 32 is deformed.

Figure 9:
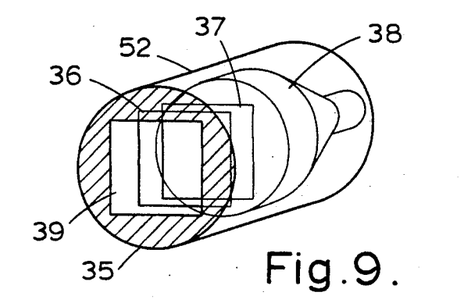
FIG. 9 is a more detailed perspective view of the transducer assembly used in the apparatus shown in FIG. 1.

The transducer assembly 17 is shown in more detail in FIG. 9. The assembly 17 is composed of a housing 52 with an apertured plate 35 as one end wall, a filter 36, a diffuser 37 and a photomultiplier device 38.

The plate 35 has a relatively large square aperture 39 which receives a beam of light reflected from the sheet 10. The relative largeness of the aperture enables the sheet 10 to be tilted to a certain extent without impairing the operation of the apparatus. By being square the aperture allows equal angles of tilt from the normal position both laterally and longitudinal of the sheet, i.e. from side to side and front to rear. The filter 36 is designed to transmit light at the wavelength of the laser beam. The filter 36 can be of the simple absorption type or else of the interference type.

The diffuser 37 serves to spread the light passed through the filter 36 over an area of the photocathode of the photomultiplier device 38. In this way variations in the sensitivity of the photocathode can be compensated for.

The light would preferably emerge from the diffuser with a cone angle of about 20° or less to prevent light being scattered from the envelope of the device 38.

The device 38 is preferably of the type where the incident light is fed into one end of the envelope; the photocathode is relatively large, say 15cm. diameter, and is selectively sensitive to the laser beam wavelength. The dynode electrode would be designed such as to enable an adequate response to rapid changes in the light intensity.

Figure 10:
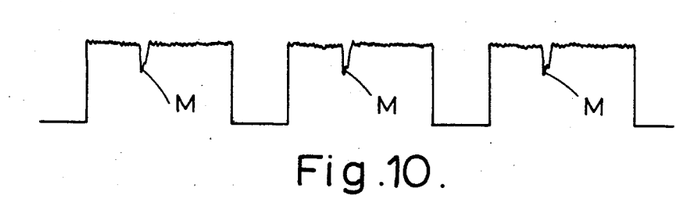
FIG. 10 depicts the waveforms produced by the apparatus shown in FIG. 1.

The anode of the device 38 may be connected to one or more cascaded amplifiers producing the waveform depicted in FIG. 10.

Due to the coherent nature of the laser beam it has been found that interference fringes can be obtained from thin films of oil or grease contaminating the surface of the material. This effect can produce very high frequency modulation superimposed on the electrical signal produced by the apparatus and enables flaw indicative information attributable to physical damage to the surface to be distinguished from mere surface contamination.

Figure 11:
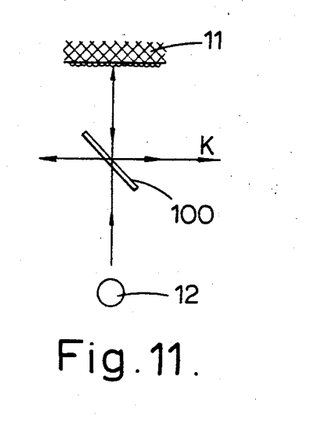
FIG. 11 is a schematic diagram of a simple beam directing arrangement for use in inspection apparatus.
Figure 12:
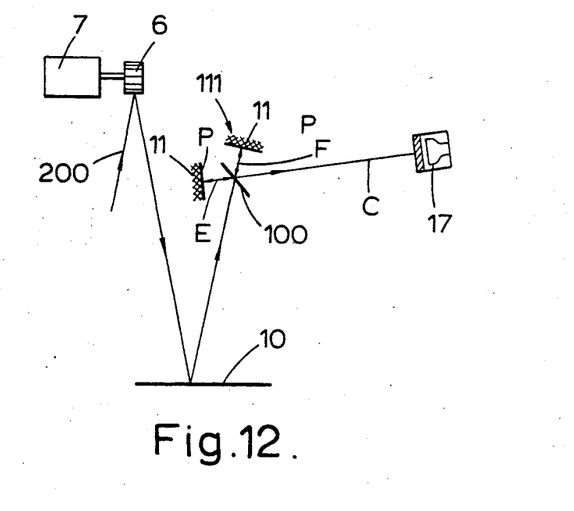
FIG. 12 is a schematic diagram of part of a modified inspection apparatus.

The apparatus can be modified as shown in FIG. 12 to eliminate the cylindrical mirror 9. Before considering FIG. 12 it may be convenient to consider FIG. 11 which depicts the principle of operation of a beam directing arrangement which may be utilized inter alia in the FIG. 12 form of apparatus to replace the mirror 9. As shown in FIG. 11 the beam directing arrangement employs a beam splitting device 100 in combination with a retro-reflective means 11. A source of radiation 12 provides a beam of radiation, such as light, a component of which passes through the device 100 and is reflected back to the device 100 along the same path with a certain degree of diffusion effected by the means 11. A component of the beam reflected back to the device 100 then emerges in a new direction denoted K.

The retro-reflective means 11 can conveniently be in the form of a tape or the like containing a large number of shaped e.g. spherical, reflective particles. This form of retro-reflective means acts as a directional diffuser so that there is some scattering of the radiation reflected back in the direction of the incident radiation as is desirable.

The beam splitting device 100 can also take various forms. Since the device 100 is not used to produce an image and hence multiple reflections can be tolerated, the device can for example be fabricated from a single sheet or multiple sheets of glass. Preferably the device 100 is arranged to split the beam of radiation into components of nominally equal intensity. To this end the device 100 may be a sheet of glass provided with a semi-reflective coating on one side. Alternatively, an uncoated sheet of glass may be used in an arrangement whereby light is incident on the sheet at an appropriate angle such as is described hereinafter.

In FIG. 12 like reference numerals denote like parts to those shown in FIGS. 1 and 11. As shown in FIG. 12 a beam 200 of light, is directed onto the rotatable scanning device 6 driven by the drive means 7. It will be recalled that as the device 6 is rotated the reflected beam of light is made to move in cyclic manner in a direction perpendicular to the general plane of FIG. 12 to produce a line scan across the upper surface of the material 10. The light reflected back from the material 10 is, in this apparatus, passed to a static reflecting means denoted 111 and composed of the beam splitting device 100 and the retro-reflective means 11. More particularly, the beam is initially passed to the beam splitting device 100 and thence the separated beam components denoted E and F, which may be of substantially equal intensity, are reflected back to the device 100 by two separate retro-reflective means 11. These reflected beam components then combine and are re-directed in part as an output beam denoted C which passes into the transducer assembly 17. The device 6 and the assembly 17 are at the same optical distance from the arrangement 100, 11 to form conjugate points in respect of the arrangement 100, 11 and the material 10 and a large proportion of the light reflected from the material 10 is directed to the transducer assembly 17 throughout the scanning process.

This modification to the FIG. 1 apparatus is advantageous since the arrangement 10, 11 shown in FIG. 12 is somewhat simpler and less expensive than the cylindrical mirror 9 being less critically dependent on accurate dimensions.

The provision of two separate retro-reflective means 11, e.g., two separate pieces of retro-reflective tape, as represented in FIG. 12 is not essential since the function of the means 11 is not critically dependent on the shape or position thereof. A single piece of tape which may be planar or curved can be used to provide the two active portions intercepting the beams E and F and represented in FIG. 12 by the letters P.

Another form of apparatus is depicted in FIG. 13 and again like reference numerals are used to denote like parts. In this construction the beam expanding device 2 and the prism assembly 4 are positionally reversed in relation to the FIG. 1 form of apparatus and the material 10 under investigation transmits the light reflected by the scanning device 6. The material 10 may be, for example, a moving sheet of transparent plastics material such as polythene or polyethylene terephthalate. With such materials it is desirable to detect the presence of bubbles, holes or similar defects.

Figure 13:
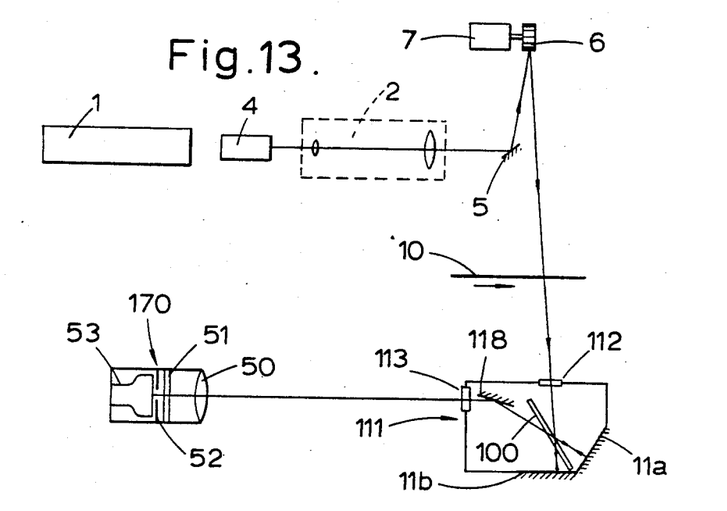
FIG. 13 is a schematic side view of a further form of material inspection apparatus.

The light transmitted through the material 10 is re-directed by a static reflecting means generally designated 111, into a transducer assembly 170. The reflecting means 111 is composed of a housing having an entry window 112 and an exit window 113. Within the housing is arranged the beam splitting device 100 two retro-reflective means 11a, 11b, each in the form of a strip of the aforementioned tape, and a plane mirror 118. The light entering the housing through the window 112 is split into two components by the device 100, one component passing onto the means 11a and one component passing onto the means 11b. These components are reflected by the means 11a, 11b with some diffusion and re-combine to pass onto the mirror 118. The mirror 118 enables the components 100, 11a, 11b to be conveniently positioned so that the entry light beam is directed at a small angle of incidence in relation to the device 100 thereby making the proportion of light reflected by the device 100 approach 50 percent of the incident intensity. The device 2 is arranged to produce a beam of light which is focussed onto the material 10. By ensuring that the reflecting means 111 is not too close to the material 10 the light transmitted by the material 10 can be de-focussed at the means 11a, 11b to thereby prevent the assembly 17 from detecting the fine structure of the means 11a, 11b or the presence of foreign material such as dust.

The transducer assembly 170 is a modified version of the assembly 17 shown in FIG. 9 but this modified assembly 170 can also be used in the FIG. 1 or FIG. 12 forms of apparatus. As shown in FIG. 13, the assembly 170 has a lens 50 which acts to focus the light from the means 111 onto an entry slit 52 in front of a photomultiplier 53. The lens 50 is preferably de-focussed in relation to the photocathode of the photomultiplier 53 to prevent the apparatus from being too sensitive to variation in the sensitivity of the photocathode although a diffuser could also be employed. An optical filter 51 is disposed between the lens 50 and the slit 52. The provision of the lens 50 and the slit 52 enables an increased intensity of scanned light to be fed to the photomultiplier 53 and this in combination with the filter 51 reduces the amount of ambient light fed to the photomultiplier 53.

Figures 14, 15:
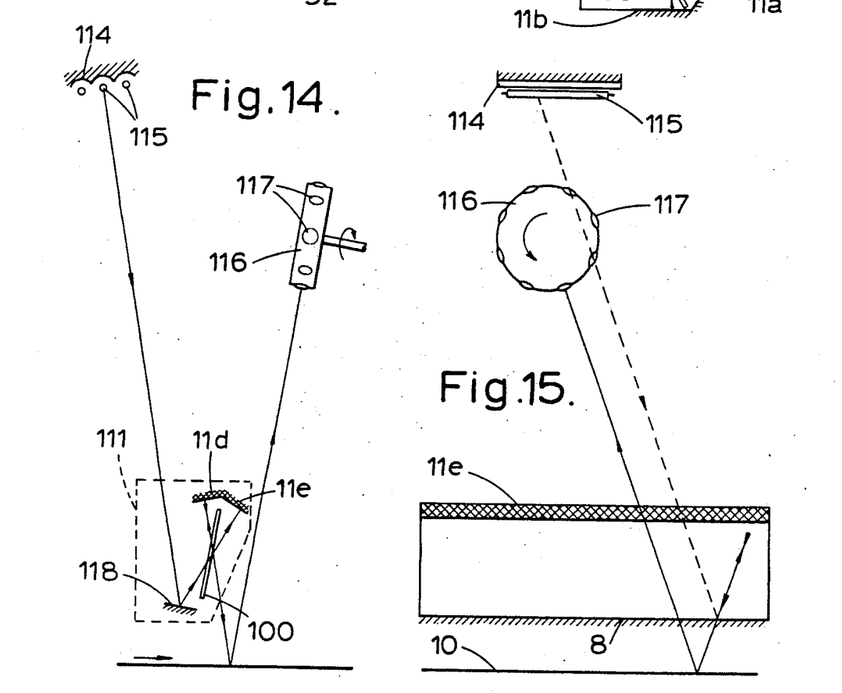
FIG. 14 is a schematic side view of another form of material inspection apparatus.
FIG. 15 is a schematic end view of the apparatus shown in FIG. 14.

A different form of apparatus is illustrated in FIGS. 14 and 15. In this apparatus a light source is composed of a series of lamps 115, such as tungsten halogen strip lamps, disposed beneath a reflector in the form of contiguous cylindrical mirrors 114. The source provides a large area of illumination in the form of a light beam which is directed into a static reflecting means 111 composed of a plane mirror 118, a beam splitting device 100 and two retro-reflective means in the form of one or more strips of tape 11d, 11e of the type mentioned above.

The beam of light provided by the source is directed onto the means 11e, 11d. The light entering the means 111 is reflected from the mirror 118 and split into two components by the device 100. These components are reflected by the means 11d, 11e and re-combine to form an output beam directed at the upper surface of the material 10 under investigation. As with the means 111 of FIG. 13 the arrangement is such that the light beam is directed at the device 100 at a small angle of incidence. The light reflected from the material 10 is directed at a rotatable drum 116 having a plurality of lenses 117 on its peripheral surface. As the drum 116 rotates each lens 117 is moved over the surface of the material 10 and an image of the surface is focussed onto an entry slit (not shown) at the centre of the drum 116. The source and the centre of the drum would be the same optical distance from the means 111. The light collected by the slit in the drum 116 is converted into a waveform of the type shown in FIG. 10 by a simple photomultiplier or by the transducer assembly 17, 170 and processed by an electronic system. The drum 116 and the electronic system may be of the type described in our U.S. Patent application Ser. No. 20661 herein incorporated by reference. The main advantage of incorporating the means 111 is that a better signal to noise ratio can be achieved since the level of active light intensity can be greater. Also better resolution of defects can be achieved since the light is more directional.

We claim:

1. In an apparatus for inspecting materials; said apparatus comprising source means for providing a beam of electromagnetic radiation, means for scanning the material under investigation with radiation produced by the source means, static radiation reflecting means arranged to re-direct radiation from the scanning means onto the material and means for deriving an electrical signal from scanned radiation influenced by the presence of the material, which signal is indicative of defects in the material the improvement characterized by the scanning means and the deriving means being located at conjugate focal positions with respect to the optical system comprising the static reflecting means and the material.

2. In an apparatus for inspecting material; said apparatus comprising source means for providing a beam of electromagnetic radiation, means for scanning the material under investigation with radiation produced by the source means, means for deriving an electrical signal from scanned radiation influenced by the presence of the material and indicative of defects in the material, and static radiation reflecting means arranged to re-direct radiation from the material to the deriving means, the improvement characterized by the scanning means and the deriving means being located at conjugate focal positions with respect to the optical system comprising the static reflecting means and the material.

3. In an apparatus for inspecting materials; said apparatus comprising source means for producing a beam of electromagnetic radiation, means for scanning the material under investigation to collect radiation influenced by the presence of the material, means for deriving an electrical signal from the collected radiation and indicative of defects in the material, and static radiation reflective means arranged to re-direct radiation from the source means onto the material, the improvement characterized by the source means and the scanning means being located at conjugate focal positions with respect to the optical system comprising the static reflecting means and the material.

4. An apparatus according to claim 1, wherein the scanning means is a rotatable body having a plurality of radiation-reflective surfaces onto which the beam provided by said source means is directed with the radiation reflected from said surfaces being in turn directed at the material.

5. An apparatus according to claim 2, wherein the scanning means is a rotatable body having a plurality of radiation-reflective surfaces onto which the beam provided by said source means is directed with the radiation reflected from said surfaces being in turn directed at the material.

6. An apparatus according to claim 3, wherein the scanning means is a rotatable drum having a plurality of lenses arranged around its periphery, the lenses being adapted to collect radiation influenced by the presence of the material.

7. An apparatus according to claim 4, wherein the static reflecting means comprises a cylindrical mirror arranged to re-direct radiation from the rotatable body onto the material.

8. An apparatus according to claim 5, wherein the static reflecting means comprises a beam splitting device and at least one retro-reflective means.

9. An apparatus according to claim 6, wherein the static reflecting means comprises a beam splitting device and at least one retro-reflective means.

10. An apparatus according to claim 8, wherein the static reflecting means has two retro-reflective means.

11. An apparatus according to claim 8, wherein retro-reflective means is in the form of a strip of tape provided with a multiplicity of shaped reflective particles which act to re-direct radiation back along the incident path.

12. An apparatus according to claim 9, wherein retro-reflective means is in the form of a strip of tape provided with a multiplicity of shaped reflective particles which act to re-direct radiation back along the incident path.

13. An apparatus according to claim 7, wherein a plane mirror is operably disposed between said rotatable body and the cylindrical mirror.

14. An apparatus according to claim 13, wherein a further plane mirror is operably disposed between said source means and the rotatable body.

15. An apparatus according to claim 1, wherein there is provided a beam shaping arrangement for shaping the beam of radiation passed to said rotatable body and derived from the source means, said arrangement at least including a system of lenses for expanding the beam from the source means.

16. An apparatus according to claim 15, wherein the beam shaping arrangement further comprises at least one apertured plate receiving the expanded radiation beam.

17. An apparatus according to claim 15, wherein the beam shaping arrangement further comprises an assembly of prisms for reducing one dimension of the beam emanating from said lens system.

18. An apparatus according to claim 1 wherein the deriving means is in the form of a housing with an ingress for receiving radiation, the housing containing a photomultiplier device.

19. An apparatus according to claim 2, wherein the deriving means is in the form of a housing with an ingress for receiving radiation, the housing containing a photomultiplier device.

20. An apparatus according to claim 19, wherein a lens is arranged at said ingress.

21. An apparatus according to claim 18, wherein an apertured wall is provided at said ingress.

22. An apparatus according to claim 18 wherein an optical filter is disposed between the ingress and the photomultiplier device.

23. An apparatus according to claim 18 wherein a diffuser is disposed between the ingress and the photomultiplier device.

24. An apparatus according to claim 8 wherein the static reflecting means is additionally composed of a plane mirror for re-directing radiation which is derived from the beam and has been re-directed by the beam splitting device and the retro-reflective means.

25. An apparatus according to claim 9, wherein the static reflecting means is additionally composed of a plane mirror for re-directing radiation from the source means to the beam splitting device.

26. In a material inspection apparatus, an arrangement for use in re-directing a beam of electromagnetic radiation, said arrangement comprising: a beam splitting device for transmitting a first component of an incident beam of radiation and for reflecting a second component of the incident beam along a different path to said first component, and retro-reflective means having at least two active portions, one of said portions being positioned to generally reflect said first component back to the beam splitting device for reflection therefrom as a third beam of radiation and another of said portions being positioned to generally reflect said second component back to the beam splitting device for transmission therethrough as a fourth beam of radiation, said third and fourth beams combining to provide an emergent re-directed composite beam of radiation from the arrangement.

27. An arrangement according to claim 26, wherein the retro-reflective means is a tape containing numerous small reflective particles.

28. An arrangement according to claim 26, wherein the retro-reflective means is composed of a plurality of reflective elements each shaped to correspond to a corner of a cube and affixed in position.

* * * * *